(12) United States Patent
Cai

(10) Patent No.: US 8,318,335 B2
(45) Date of Patent: Nov. 27, 2012

(54) ELECTRONIC DEVICE

(75) Inventor: Ye Cai, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 819 days.

(21) Appl. No.: 12/488,728

(22) Filed: Jun. 22, 2009

(65) Prior Publication Data

US 2010/0178542 A1 Jul. 15, 2010

(30) Foreign Application Priority Data

Jan. 13, 2009 (CN) .......................... 2009 1 0300168

(51) Int. Cl.
*H01M 2/10* (2006.01)
(52) U.S. Cl. ......................................... 429/99; 429/100
(58) Field of Classification Search .................. None
See application file for complete search history.

(56) References Cited

U.S. PATENT DOCUMENTS 6,936,376 B2 * 8/2005 Plumadore ....................... 429/96
2009/0111008 A1 * 4/2009 Wen ................................ 429/96

FOREIGN PATENT DOCUMENTS

CN 2395393 Y 9/2000
JP 2006269292 A 10/2006
* cited by examiner

*Primary Examiner* — Barbara Gilliam
*Assistant Examiner* — Stephan Essex
(74) *Attorney, Agent, or Firm* — Altis Law Group, Inc.

(57) ABSTRACT

An electronic device includes a main body, at least one electrical conducting member, and a first battery. The main body defines a battery holding portion to receive the first battery. The first battery defines an electrical conducting groove. The at least one electrical conducting member is disposed on the battery holding portion, and can be received in the corresponding electrical conducting groove of the first battery. When the first battery is replaced by a second battery the same as the first battery, the at least one electrical conducting member is electrically received in the electrical conducting grooves of the first battery and the second battery at the same time before the first battery is detached from the battery holding portion.

9 Claims, 5 Drawing Sheets

ELECTRONIC DEVICE

BACKGROUND

1. Technical Field

The present disclosure relates to electronic devices and, particularly, to an electronic device capable of replacing a battery while in a powered-on state.

2. Description of the Related Art

Electronic devices, for example, mobile phones, personal digital assistants (PDA), and others, often receive operating power from a battery. The power supply is determined by the capacitance of the battery. When the power supply is exhausted, the battery must be replaced with an auxiliary battery, or be recharged. However, during replacement of the battery, the electronic device must be powered off.

A frequently employed electronic device includes a reserve power source and a battery in main body. The reserve power source and the battery are electrically connected to a circuit of the electronic device in parallel. The reserve power source may be a capacitance or battery. During replacement of the battery, the reserve power source supplies electrical power to the electronic device to ensure uninterrupted operation.

However, such reserve power sources for the electronic device tends to be bulky and complicated.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
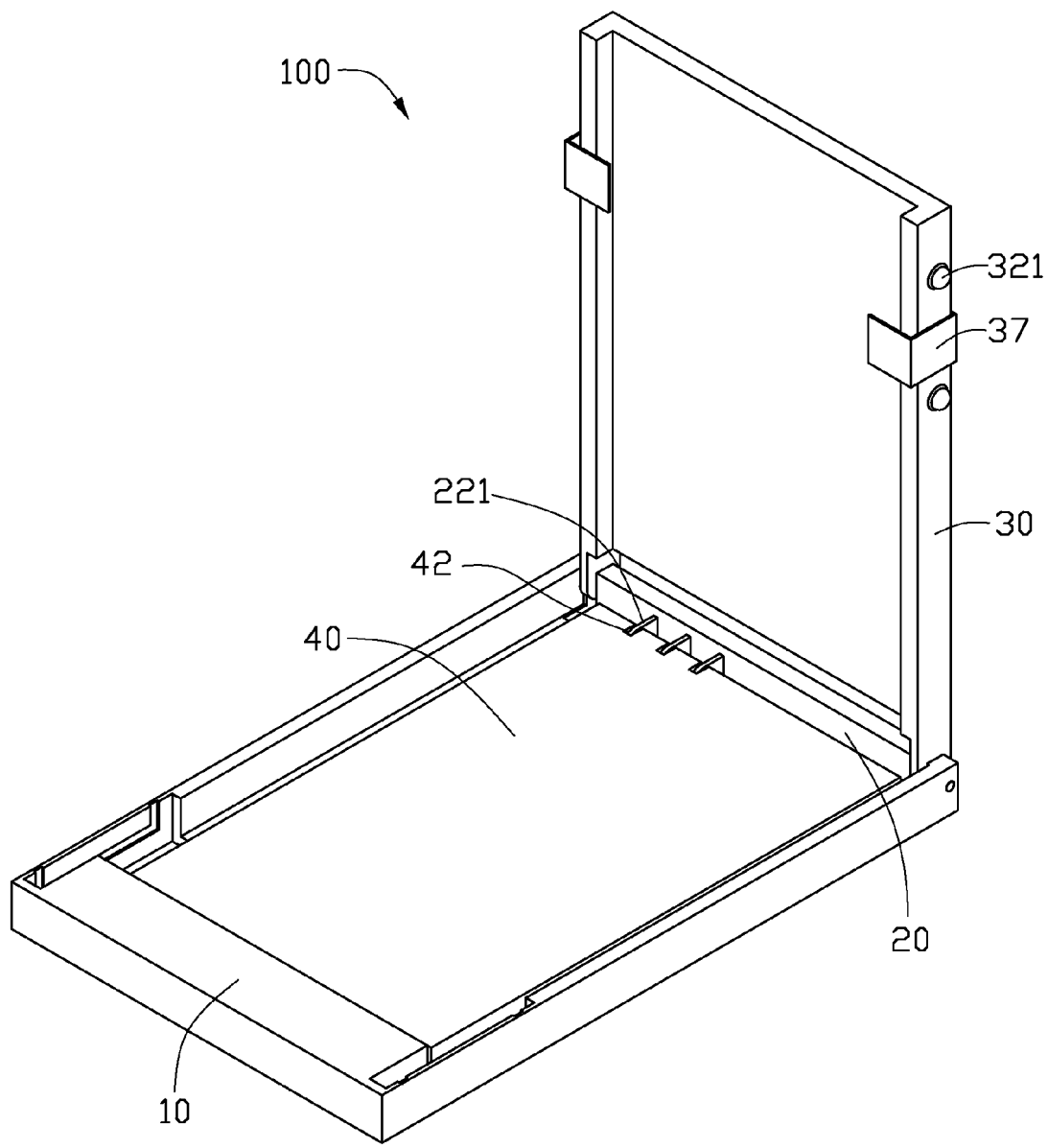
FIG. 1 is an isometric view of an embodiment of an electronic device, the electronic device including a main body, and a first battery.

Referring to FIG. 1, an embodiment of an electronic device 100 includes a main body 20, three electrical conducting members 28, and a first battery 40. The main body 20 defines a battery holding portion 21 to receive the first battery 40. The three conducting members 28 are positioned in the battery holding portion 21. The first battery 40 is electrically connected to the three electrical conducting members 28.

Figure 2:
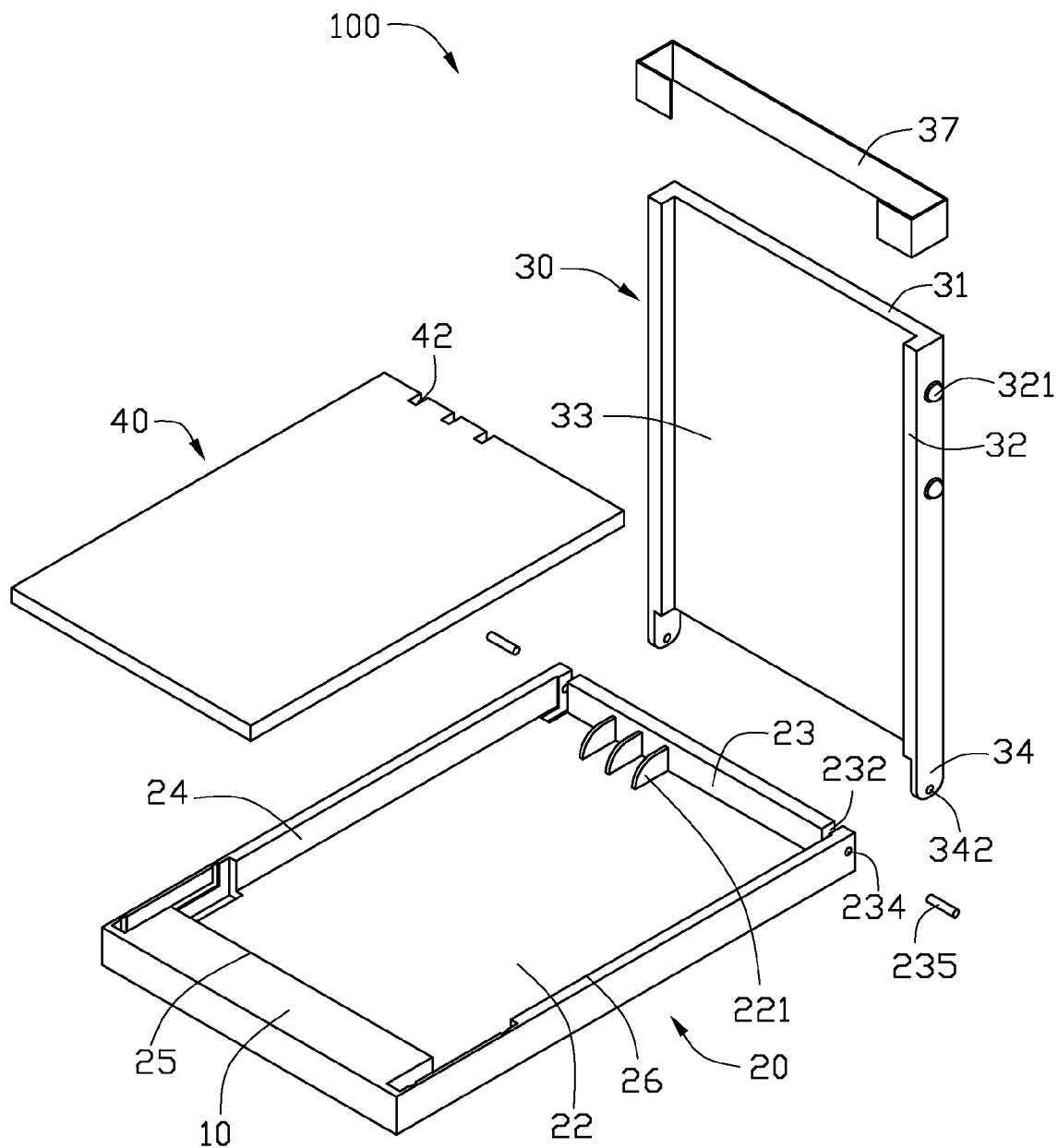
FIG. 2 is an exploded, isometric view of the electronic device of FIG. 1.
Figure 3:
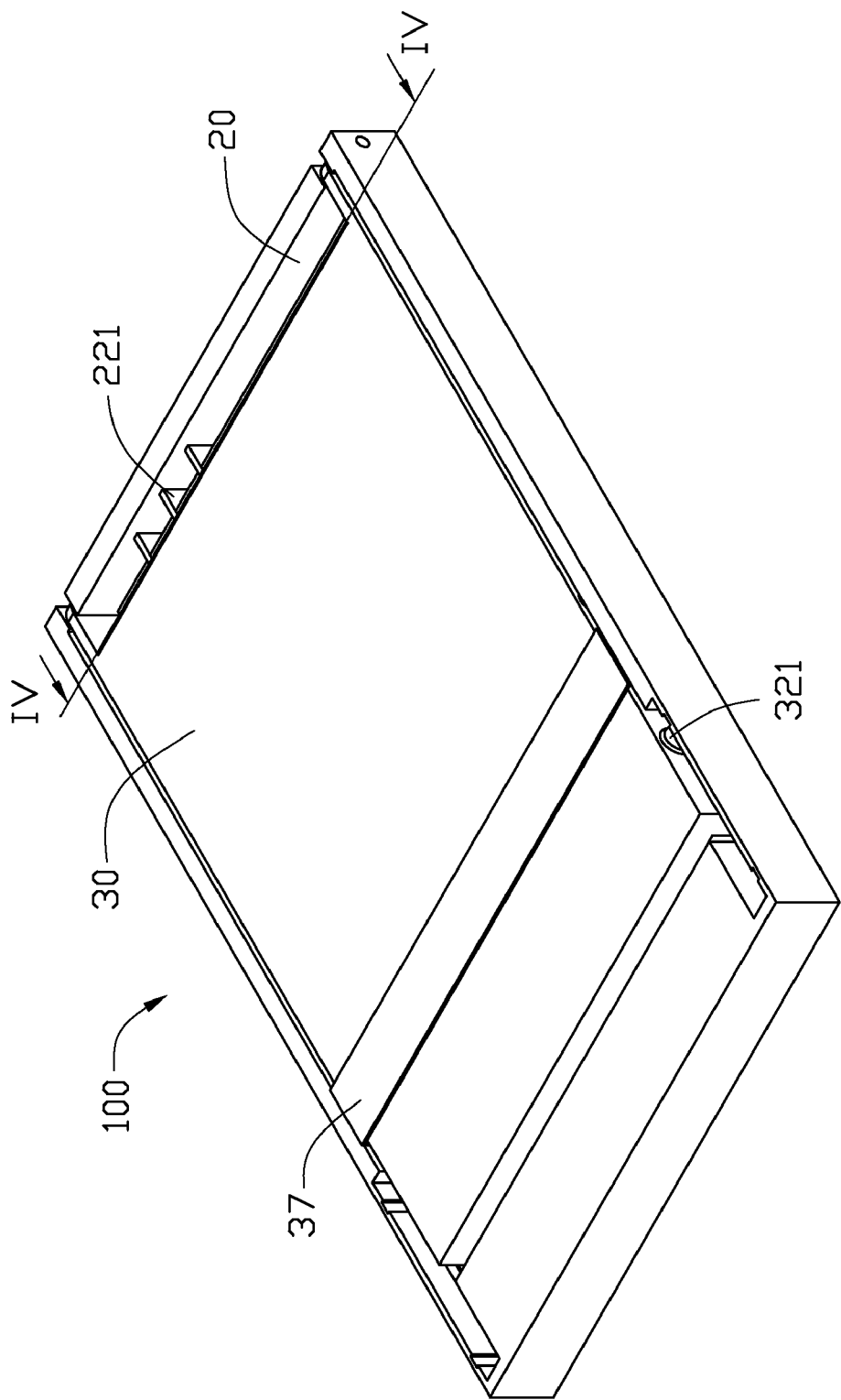
FIG. 3 is an assembled, isometric view of the electronic device of FIG. 2.

Referring to FIGS. 2 and 3, the battery holding portion 21 includes a bottom surface 22, a first side surface 23, a second side surface 24, a third side surface 25 opposite to the first side surface 23, and a fourth side surface 26 opposite to the second side surface 26. The bottom surface 22 adjoins to the first side surface 23, the second side surface 24, the third side surface 25 and the fourth side surface 26.

The three electrical conducting members 28 are spaced apart and extend perpendicular from an edge of the bottom surface 22 in contact with the first side surface 23. In the illustrated embodiment, each of the three electrical conducting members 28 may be a metallic sheet having an arcuate corner 281 spaced from the bottom surface 22 and the first side surface 23.

Figure 4:
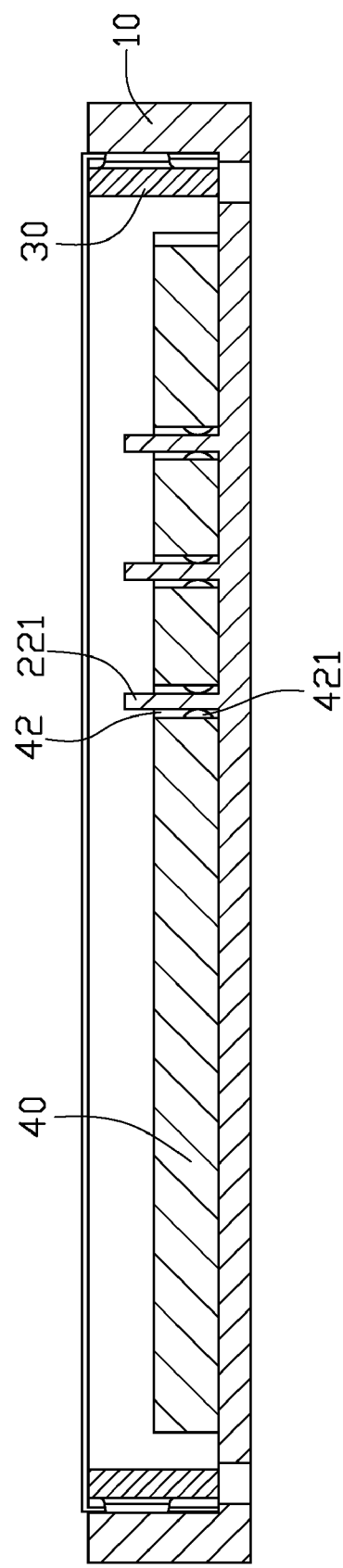
FIG. 4 is a cross-section of the electronic device taken along line IV-IV of FIG. 3.
Figure 5:
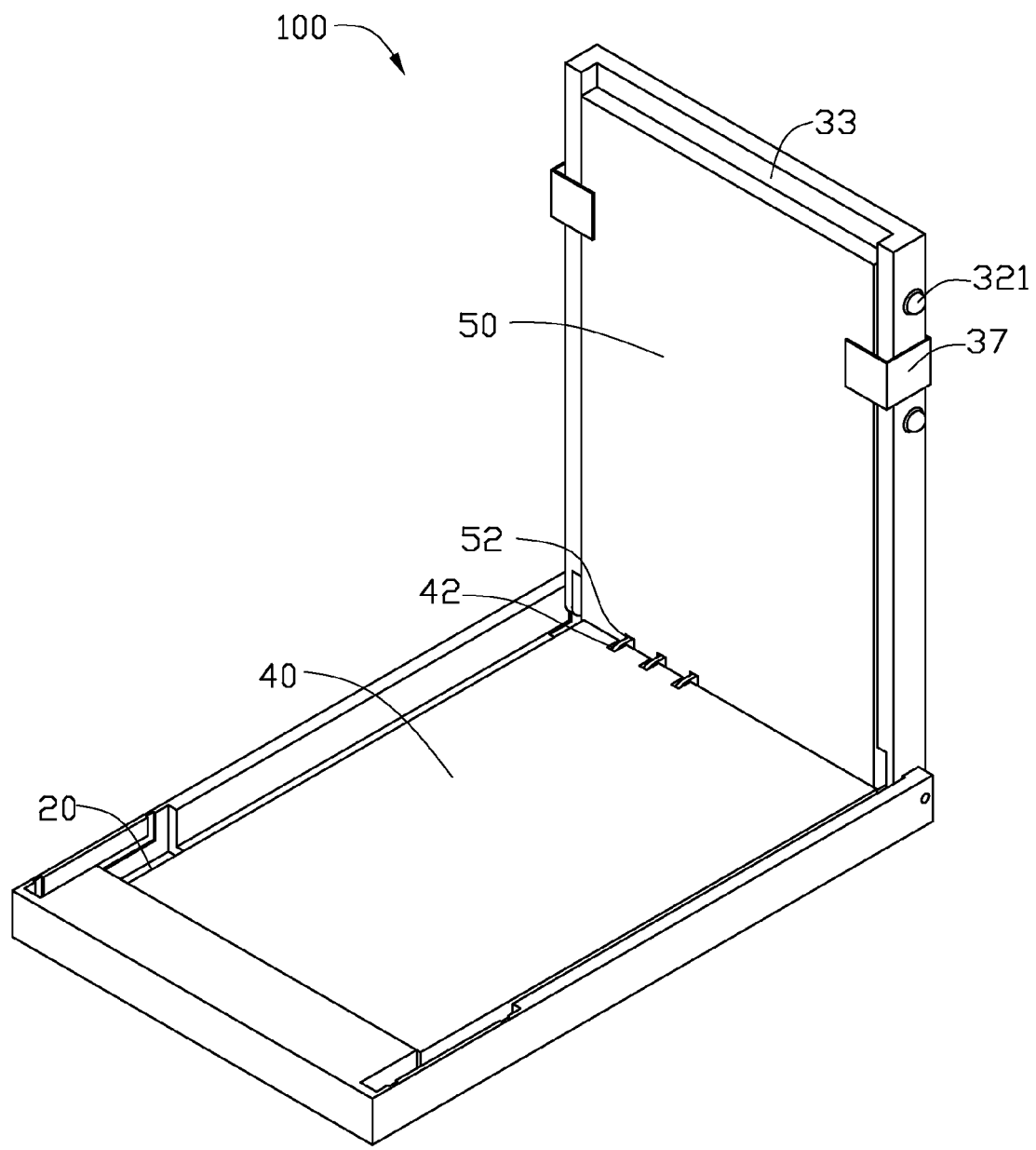
FIG. 5 is an isometric view of the electronic device of FIG. 1 assembled with a second battery.

The first battery 40 defines three electrical conducting grooves 42 to receive corresponding electrical conducting members 28. The first battery 40 further includes a pair of electrical conducting points 421 disposed on two opposite inner sidewalls of the electrical conducting groove (shown in FIG. 4). The electrical conducting point 421 can be deformed elastically, such that the electrical conducting member 28 can be tightly held between the pair of electrical conducting points 421.

The electronic device 100 further includes a second battery 50 to replace the first battery 40. The second battery 50 defines three electrical conducting grooves 52 the same as the first battery 40. When the three electrical conducting members 28 are held tightly in the electrical conducting grooves 52 and the electrical conducting grooves 42, the first battery 40 and the second battery 50 can electrically connect to the three electrical conducting members 28.

The electronic device 100 further includes two shafts 235. The main body 20 defines two notches 232 adjacent to the first side surface 23 of the battery holding portion 21. Each shaft 235 is disposed between two opposite inner surfaces of one notch 232.

The electronic device 100 further includes a rotary member 30 rotatably connected to an end of the main body 20. The rotary member 30 can be received in the battery holding portion 21.

The rotary member 30 includes a planar plate 31 and two opposite sidewalls 32 extending from two opposite edges of the planar plate 31. The planar plate 31 and the two sidewalls 32 cooperatively define a battery holding portion 33. The rotary member 30 further includes a connecting portion 34 extending from an end of each sidewall 32 and two resilient protrusions 321 disposed on each side surface of the sidewalls 32. Each of the connecting portions 34 defines a through hole 342. The two shafts 235 are received in the corresponding through hole 342 to allow the rotary member 30 to rotatably connect to the main body 20. The electronic device 100 further includes a limiting member 37 coiled on the rotary member 30 and fixed between the two resilient protrusions 321. The limiting member 37 detaches from the rotary member 30 by deformation of the resilient protrusions 321. In the illustrated embodiment, the limiting member 37 is a rectangular metallic ring having a gap. In an alternative embodiment, the limiting member 37 may be a rubber ring.

For replacement of the first battery 40 received in the battery holding portion 21, the rotary member 30 is rotated relative to the main body 20 until the rotary member 30 is perpendicular to the main body 20. The second battery 50 is then placed into the battery holding portion 33 of the rotary member 30. The three electrical conducting members 28 are received in the corresponding electrical conducting grooves 52. The limiting member 37 is fixed between the two resilient protrusions 321 of the rotary member 30, such that the second battery 50 fixed in the battery holding portion 33 of the rotary member 30. The first battery 40 is detached from the battery holding portion 21. Finally, the rotary member 30 is rotated to assemble with the main body 20.

It should be pointed out that each electrical conducting member 28 is received in the electrical conducting groove 42 of the first battery 40 and the electrical conducting groove 50 of the second battery 50.

It is to be understood that the number of electrical conducting members 28 is one or more, and the first battery 40 and the second battery 50 each define corresponding electrical conducting grooves to receive the electrical conducting member 28. Furthermore, an internal circuitry (not shown) prevents circuit overloads when the first battery 40 and the second battery 50 are providing power to the electronic device 100.

Finally, while the embodiments have been described and illustrated, the disclosure is not to be construed as being limited thereto. Various modifications can be made to the embodiments by those of ordinary skilled in the art without departing from the true spirit and scope of the disclosure as defined by the appended claims.

What is claimed is:

1. An electronic device comprising:
    a first battery defining an electrical conducting groove;
    a main body defining a battery holding portion to receive the first battery; and
    at least one electrical conducting member disposed in the battery holding portion, the at least one electrical conducting member being received in the electrical conducting groove of the first battery;
    wherein, when the first battery is replaced by a second battery the same as the first battery, each of the at least one electrical conducting members are electrically received in the electrical conducting grooves of the first battery and the second battery at the same time before the first battery is detached from the first holding portion; and
    wherein the electronic device further comprises a rotary member defining a battery holding portion, the rotary member rotating relative to the main body.

2. The electronic device of claim 1, wherein the electrical conducting member is an electrical conducting sheet extending perpendicularly from a bottom surface of the first holding portion.

3. The electronic device of claim 2, wherein the at least one electrical conducting member is a metallic sheet having an arcuate corner spaced from the bottom surface of the first holding portion.

4. The electronic device of claim 1, wherein the rotary member comprises a planar plate and two sidewalls extending from two opposite edges thereof, the planar plate and the two sidewalls cooperatively defining the battery holding portion of the rotary member.

5. The electronic device of claim 4, wherein the electronic device further comprises two shafts disposed on the main body, and the rotary member further comprising a connecting portion extending from an end of each sidewall defining a through hole to receive the shaft, such that the rotary member is rotatable relative to the main body.

6. The electronic device of claim 5, wherein the electronic device further comprises a limiting member coiling on the rotary member, the rotary member further comprising two resilient protrusions disposed on each side surface of the sidewalls, the limiting member fixed between the two resilient protrusions.

7. The electronic device of claim 6, wherein the limiting member is a rectangular metallic ring having a gap.

8. The electronic device of claim 2, wherein the first battery further comprises a pair of electrical conducting points disposed on two opposite inner sidewalls of each electrical conducting groove, the electrical conducting member held between the pair of electrical conducting points.

9. The electronic device of claim 8, wherein the electrical conducting point is a resilient protrusion.

* * * * *